US012693911B2

(12) United States Patent
Han et al.

(10) Patent No.: US 12,693,911 B2
(45) Date of Patent: Jul. 28, 2026

(54) METHOD FOR ACCELERATING APPLICATION STARTUP, ELECTRONIC DEVICE, AND COMPUTER STORAGE MEDIUM

(71) Applicant: Huawei Technologies Co., Ltd., Shenzhen (CN)

(72) Inventors: Feng Han, Shenzhen (CN); Wenyong Sun, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 604 days.

(21) Appl. No.: 18/043,194

(22) PCT Filed: Aug. 4, 2021

(86) PCT No.: PCT/CN2021/110463
§ 371 (c)(1),
(2) Date: Feb. 27, 2023

(87) PCT Pub. No.: WO2022/042237
PCT Pub. Date: Mar. 3, 2022

(65) Prior Publication Data
US 2023/0385131 A1      Nov. 30, 2023

(30) Foreign Application Priority Data

Aug. 31, 2020    (CN) ......................... 202010901120.4

(51) Int. Cl.
*G06F 9/54* (2006.01)
*G06F 9/445* (2018.01)
(52) U.S. Cl.
CPC .......... *G06F 9/542* (2013.01); *G06F 9/44521* (2013.01); *G06F 9/546* (2013.01)

(58) Field of Classification Search
CPC ...... G06F 9/542; G06F 9/44521; G06F 9/546; G06F 9/445; G06F 9/44505; G06F 9/5016; G06F 9/5022; G06F 9/5027
(Continued)

(56) References Cited

U.S. PATENT DOCUMENTS

2002/0007410 A1*  1/2002  Seagren .............. G06F 11/1482
                                                                709/227
2005/0136946 A1*  6/2005  Trossen ................ H04W 4/029
                                                                455/456.2
(Continued)

FOREIGN PATENT DOCUMENTS

CN            111381902 A      7/2020

OTHER PUBLICATIONS

Huang, Jim: "Android IPC Mechanism", Nantai University of Science and Technology, Mar. 19, 2012, XP093269389, total 82 pages.

(Continued)

*Primary Examiner* — Tuan C Dao
(74) *Attorney, Agent, or Firm* — Slater Matsil, LLP

(57) ABSTRACT

A system service detects a first trigger event of a target application, loads an application program of the target application in response to the first trigger event, and transmits a communication address to the application program. The application program performs preloading, and waits to receive a message based on the communication address. The system service detects a second trigger event of the target application. The system service generates a startup instruction in response to the second trigger event of the target application, and sends the startup instruction to the application program. The application program receives the (Continued)

startup instruction by using the communication address, and starts the target application in response to the startup instruction.

20 Claims, 10 Drawing Sheets

(58) Field of Classification Search
USPC .......................................................... 719/318
See application file for complete search history.

(56) References Cited

U.S. PATENT DOCUMENTS

| | | | | |
|---|---|---|---|---|
| 2006/0010264 | A1* | 1/2006 | Rader | G06F 13/385 |
| | | | | 710/308 |
| 2009/0199122 | A1* | 8/2009 | Deutsch | G06F 9/445 |
| | | | | 715/771 |
| 2010/0043013 | A1* | 2/2010 | Wei | G06F 9/4843 |
| | | | | 719/315 |
| 2010/0064341 | A1* | 3/2010 | Aldera | H04W 8/245 |
| | | | | 726/1 |
| 2010/0215187 | A1* | 8/2010 | Moosavi | H04W 24/02 |
| | | | | 381/82 |
| 2010/0228577 | A1* | 9/2010 | Cunningham | G06Q 10/02 |
| | | | | 715/764 |
| 2012/0210112 | A1* | 8/2012 | Suganami | H04L 12/12 |
| | | | | 713/323 |
| 2014/0059129 | A1* | 2/2014 | Chumbley | G06F 16/955 |
| | | | | 709/204 |
| 2015/0138142 | A1* | 5/2015 | Liao | G06F 3/045 |
| | | | | 345/174 |
| 2015/0277710 | A1 | 10/2015 | Lee et al. | |
| 2016/0092010 | A1* | 3/2016 | Agarwal | G06F 3/0412 |
| | | | | 345/173 |
| 2016/0162102 | A1* | 6/2016 | Shahparnia | G06F 1/3215 |
| | | | | 345/174 |
| 2016/0224177 | A1* | 8/2016 | Krah | G06F 3/03545 |
| 2016/0352886 | A1* | 12/2016 | Dickow | H04M 1/724098 |
| 2016/0378208 | A1* | 12/2016 | Shahparnia | G06F 3/0442 |
| | | | | 345/173 |
| 2018/0239620 | A1* | 8/2018 | Tsirkin | G06F 9/4843 |
| 2019/0073097 | A1* | 3/2019 | Zhong | G06F 3/04817 |
| 2019/0138919 | A1 | 5/2019 | Chen | |
| 2019/0188111 | A1* | 6/2019 | Ozog | G06F 11/3612 |
| 2019/0354384 | A1* | 11/2019 | Huang | G06F 9/44521 |

OTHER PUBLICATIONS

Anonymous, "Android Activity Lifecycle-javatpoint", https://training. trainingtrains.com/android-life-cycle-of-activity.html, Mar. 2016, XP055630633, total 8 pages.
Baumann Paul et al: "Every Byte Counts: Selective Prefetching for Mobile Applications", Proceedings of the ACM on Interactive, Mobile, Wearable and Ubiquitous Technologies, ACMPUB27, New York, NY, USA, vol. 1, No. 2, Article 6, Jun. 30, 2017 (Jun. 30, 2017), pp. 1-29, XP058490680.

* cited by examiner

In response to a touch operation, a system service determines a
touch location corresponding to the touch operation    S301

Determine, based on
the touch location, whether a target
application is tapped    S302

No

Yes

Determine that a first trigger event occurs on the target application    S303

METHOD FOR ACCELERATING APPLICATION STARTUP, ELECTRONIC DEVICE, AND COMPUTER STORAGE MEDIUM

CROSS-REFERENCE TO RELATED APPLICATIONS

This application is a National Stage of International Application No. PCT/CN2021/110463, filed on Aug. 4, 2021, which claims priority to Chinese Patent Application No. 202010901120.4, filed on Aug. 31, 2020, both of which are hereby incorporated by reference in their entireties.

TECHNICAL FIELD

This application relates to the field of mobile terminal technologies, and in particular, to a method for accelerating application startup, an electronic device, and a computer storage medium.

BACKGROUND

With widespread application of mobile terminals such as smartphones, smartphones can support an increasing quantity of applications, have increasingly powerful functions, develop toward diversification and personalization, and have become indispensable electronic products in users' lives. However, a startup speed of an application on a smartphone has become an important factor that affects consumer experience and media evaluation. Currently, in the conventional technology, when an application is used, the application is started in advance and placed in the background. To be specific, after a smartphone is powered on, an application is started and is set to run in the background, and after a user touches the application, a background program only needs to be set to a foreground application. However, in the foregoing solution, an application program is executed when the application is started, and the application program receives all messages in the background. As a result, data processing by the application program is uncontrollable, and memory usage is excessively large when the application program loads data.

SUMMARY

In view of the foregoing content, a method for accelerating application startup, an electronic device, and a computer storage medium need to be provided, to make a preloading behavior of an application program controllable and avoid excessively large memory usage when the application program loads data.

According to a first aspect, this application provides a method for accelerating application startup, specifically including:

a system service detects a first trigger event of a target application;

the system service loads an application program of the target application in response to the first trigger event, and transmits a communication address to the application program; the application program performs preloading;

the application program waits to receive a message based on the communication address;

the system service detects a second trigger event of the target application;

the system service generates a startup instruction in response to the second trigger event of the target application, and sends the startup instruction to the application program;

the application program receives the startup instruction by using the communication address; and the application program starts the target application in response to the startup instruction.

In this embodiment of this application, when the application program detects, by using the communication address, the startup instruction sent by the system service, the application program starts the target application in response to the startup instruction, so that socket blocking is implemented when the application program starts the target application. Therefore, in a preloading process of the application program of the target application before the application program of the target application receives the startup instruction, no excessive CPU resources, input/output resources, or memory space needs to be occupied, thereby ensuring controllable preloading behavior of the target application and increasing an application startup speed.

In a possible design, the method further includes: that the application program waits to receive a message based on the communication address includes:

the application program creates a server or a client based on the communication address; and the server or the client waits to receive a message based on the communication address.

According to the foregoing technical solution, the application program may receive, by using the server or the client, a message that waits to be received based on the communication address.

In a possible design, the communication address is a socket address, the server is a socket server, and the client is a socket server.

According to the foregoing technical solution, the system service and the application program implement a socket communication mechanism.

In a possible design, the method further includes:

before the server or the client receives the startup instruction, the application program suspends execution of application code of the target application, and waits to receive the startup instruction;

the application program skips creating a child thread service; and the application program skips initializing binder communication.

According to the foregoing technical solution, in the preloading process of the application program of the target application before the application program of the target application receives the startup instruction, usage of CPU resources and input/output resources is further reduced, thereby ensuring controllable preloading behavior of the target application and increasing an application startup speed.

In a possible design, that the system service sends the startup instruction to the application program specifically includes: The system service sends the startup instruction to the application program by using a socket message.

According to the foregoing technical solution, the application program can receive an instruction sent by the system server.

In a possible design, that the application program receives the startup instruction by using the server or the client specifically includes:

the server or the client in the application program listens to and receives, by using an accept( ) function and the communication address, the startup instruction sent by the system service.

According to the foregoing technical solution, a socket communication mechanism between an application service process and the system service is implemented.

In a possible design, that the application program starts the target application in response to the startup instruction specifically includes:

the application program invokes and executes the application code of the target application by using an oncreat( ) function.

According to the foregoing technical solution, the application code of the target application may be quickly executed.

In a possible design, that a system service detects a first trigger event of a target application includes: When detecting a touch operation on the target application, the system service determines that the first trigger event occurs on the target application.

According to the foregoing technical solution, when it is detected that a user performs a touch operation on the target application, the first trigger event may be triggered, to preload the target application, thereby facilitating an operation performed by the user and increasing a startup speed of the target application.

In a possible design, that a system service detects a first trigger event of a target application specifically includes:

in response to the touch operation, determining, by the system service, a touch location corresponding to the touch operation;

determining, based on the touch location, whether the target application is touched; and when the target application is touched, determining that the first trigger event occurs on the target application.

According to the foregoing technical solution, the user can trigger the first trigger event only by performing a touch operation on a corresponding location of the target application on a display screen of an electronic device, to preload the target application, thereby facilitating an operation performed by the user and increasing a startup speed of the target application.

In a possible design, that the system service detects a second trigger event of the target application includes:

when detecting the first trigger event of the target application and then releasing the trigger operation, the system service determines that the second trigger event occurs on the target application.

According to the foregoing technical solution, the user only needs to perform the trigger operation on the target application and then release the trigger operation, so that the target application triggers the second trigger event, to start the target application, thereby facilitating an operation performed by the user.

In a possible design, that the system service detects a second trigger event of the target application specifically includes:

when determining that the target application is touched, performing, by the system service, timing to obtain a timing time;

determining whether the touch operation on the target application ends within a first preset time range; and if the touch operation on the target application ends within the first preset time range, determining that the second trigger event occurs on the target application.

According to the foregoing technical solution, the user can trigger the second trigger event only by stopping the touch operation within the first preset time range after performing the touch operation on the target application, to start the target application, thereby facilitating an operation performed by the user.

In a possible design, the method further includes:

if the touch operation on the target application does not end within the first preset time range, the system service determines whether the target application ends within a second preset time range; and if the touch operation ends within the second preset time range, the system service sleeps for a preset period of time; or if the touch operation does not end within the second preset time range, the system service determines that a third trigger event occurs on the target application, and displays a shortcut menu of the target application in response to the third trigger event.

According to the foregoing technical solution, when a trigger operation performed by the user on the target application exceeds the second preset time range, a shortcut menu function of the target application is displayed, so that the user can perform an operation on a shortcut function of the target application.

In a possible design, that a system service detects a first trigger event of a target application specifically includes:

obtaining, by the system service, a first speech instruction;

analyzing whether an operation object of the first speech instruction is the target application;

if the operation object of the first speech instruction is the target application, determining whether the first speech instruction includes a first control instruction; and if it is determined that the first speech instruction includes the first control instruction, determining that the first trigger event occurs on the target application.

According to the foregoing technical solution, the user can trigger the first trigger event only by using a speech instruction, to preload the target application, thereby facilitating an operation performed by the user and increasing a startup speed of the target application.

In a possible design, that the system service detects a second trigger event of the target application specifically includes:

obtaining, by the system service, a second speech instruction;

analyzing whether an operation object of the second speech instruction is the target application;

if the operation object of the second speech instruction is the target application, determining whether the second speech instruction includes a second control instruction; and if it is determined that the second speech instruction includes the second control instruction, determining that the second trigger event occurs on the target application.

According to the foregoing technical solution, the user can trigger the second trigger event only by using a speech instruction, to start the target application, thereby facilitating an operation performed by the user and improving user experience.

In a possible design, that a system service detects a first trigger event of a target application specifically includes:

the system service obtains eyeball tracking information of a user; and the system service determines, based on the eyeball tracking information, that the first trigger event occurs on a target application whose gaze duration exceeds first preset duration.

According to the foregoing technical solution, the user can trigger the first trigger event of the target application only by gazing at the target application with eyeballs, to preload the target application, thereby simplifying an operation performed by the user and increasing a startup speed of the target application.

In a possible design, that the system service detects a second trigger event of the target application specifically includes:

determining, based on the eyeball tracking information, whether gaze duration of the target application exceeds second preset duration; and if the gaze duration of the target application exceeds the second preset duration, determining that the second trigger event occurs on the target application.

According to the foregoing technical solution, the user can trigger the second trigger event of the target application only by gazing at the target application with eyeballs for longer than the second preset duration, to preload the target application, thereby simplifying an operation performed by the user and increasing a startup speed of the target application.

In a possible design, that a system service detects a first trigger event of a target application specifically includes:

the system service obtains a location of an electronic device;

the system service determines whether the location of the electronic device is within a preset area range; and if it is determined that the location of the electronic device is within the preset area range, the system service determines that the first trigger event occurs on the target application on the electronic device.

According to the foregoing technical solution, when a user carrying the electronic device appears within the preset area range, the first trigger event of the target application can be triggered, to preload the target application.

In a possible design, that a system service detects a first trigger event of a target application specifically includes:

the system service determines whether a current time is within a preset time range; and if it is determined that the current time is within the preset time range, the system service determines that the first trigger event occurs on the target application.

According to the foregoing technical solution, when the current time is within the preset time range, the first trigger event of the target application can be triggered, to preload the target application.

In a possible design, that the system service detects a second trigger event of the target application specifically includes:

when determining that the first trigger event occurs on the target application, the system service performs timing to obtain a timing time;

the system service determines whether the timing time is greater than a second preset time threshold; and if the system service determines that the timing time is greater than the second preset time threshold, the system service determines that the second trigger event occurs on the target application.

According to the foregoing technical solution, when the timing time after the first trigger event occurs reaches the second preset time threshold, the second trigger event of the target application is triggered, to start the target application.

In a possible design, the target application is an application of a preset type. According to the foregoing technical solution, a target application of a specific type may trigger the first trigger event, to preload the target application.

In a possible design, that a system service detects a first trigger event of a target application specifically includes:

the system service obtains first historical data of using the target application by a user, where the first historical data includes at least time information, frequency information, and location information of using the target application;

the system service analyzes the first historical data by using a machine learning method, and determines a usage habit condition of the user for the target application;

the system service determines whether the target application meets the usage habit condition; and if it is determined that the target application meets the usage habit condition, the system service determines that the first trigger event occurs on the target application.

According to the foregoing technical solution, when the target application meets the usage habit condition, the first trigger event of the target application can be triggered, to preload the target application.

In a possible design, that the system service generates a preload instruction in response to the first trigger event, to preload the target application specifically includes:

when the system service detects that the target application includes a plurality of applications, obtaining second historical data of the plurality of target applications;

determining a high-frequency usage time period or usage frequency of the plurality of target applications based on the second historical data of the plurality of target applications;

sorting the plurality of target applications based on a high-frequency usage time period or usage frequency of each target application; and sequentially preloading the plurality of application programs based on the sorting.

According to the foregoing technical solution, when the first trigger event occurs on the plurality of target applications, the system service may preload a target application program with a higher level based on priority levels, thereby facilitating usage by the user.

According to a second aspect, an embodiment of this application provides an electronic device, including an apparatus for performing the steps performed in the method according to any one of the first aspect or the possible designs of the first aspect.

According to a third aspect, an embodiment of this application provides a computer storage medium. The computer storage medium stores program instructions. When the program instructions are run on an electronic device, the electronic device is enabled to perform the method for accelerating application startup according to any one of the first aspect or the possible designs of the first aspect in embodiments of this application.

In addition, for technical effects of the second aspect and the third aspect, refer to the descriptions of the methods in the designs of the foregoing method part. Details are not described herein again.

DETAILED DESCRIPTION OF ILLUSTRATIVE EMBODIMENTS

The terms "first" and "second" mentioned below are merely intended for a purpose of description, and shall not be understood as an indication or implication of relative importance or implicit indication of a quantity of indicated technical features. Therefore, a feature limited by "first" or "second" may explicitly indicate or implicitly include one or more such features. In embodiments of this application, the word "example", "for example", or the like is used to represent giving an example, an illustration, or a description. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a specific manner.

Unless otherwise defined, all technical and scientific terms used in this specification have same meanings as those usually understood by a person skilled in the art of this application. Terms used in this specification of this application are merely intended to describe specific embodiments, but not to limit this application. It should be understood that "/" indicates "or", unless otherwise specified. For example, A/B may indicate A or B. The term "and/or" in this specification describes only an association relationship for describing associated objects and represents that three relationships may exist. For example, A and/or B may represent the following three cases: Only A exists, both A and B exist, and only B exists. "At least one" means one or more. "A plurality of" refers to two or more. For example, at least one of a, b, or c may indicate seven cases: a, b, c, a and b, a and c, b and c, and a, b, and c.

Figure 1:
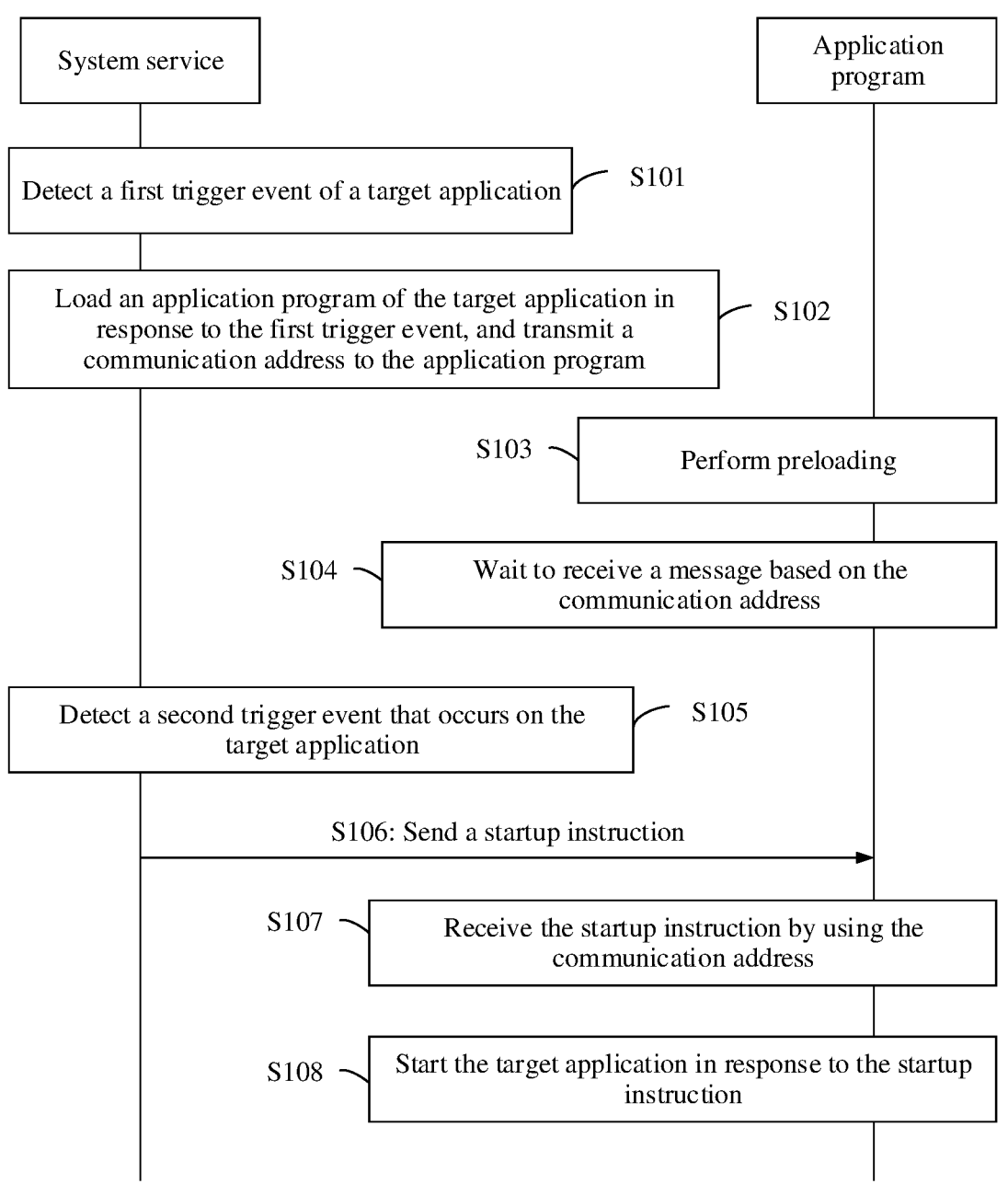
FIG. 1 is a flowchart of a method for accelerating application startup according to an embodiment of this application.

FIG. 1 is a flowchart of a method for accelerating application startup according to an embodiment of this application. The method is applied to an electronic device 1, and may specifically include the following steps.

Step S101: A system service detects a first trigger event of a target application.

In this embodiment, when detecting a touch operation on the target application, the system service determines that the first trigger event occurs on the target application. For a detailed process of detecting the first trigger event of the target application by the system service process, refer to FIG. 3, FIG. 6, and the following detailed descriptions of FIG. 3 and FIG. 6.

Step S102: The system service loads an application program of the target application in response to the first trigger event, and transmits a communication address to the application program.

In this embodiment, the system service generates a preload instruction in response to the first trigger event, generates the communication address and loads the application program of the target application according to the preload instruction, and transmits the communication address to the application program.

In this embodiment, after the system service loads the application program of the target application and transmits the communication address to the application program, a mechanism in which the loaded application program communicates with the system service by using a socket is implemented.

Step S103: The application program performs preloading.

In this embodiment, the application program loads data of the target application. Specifically, the data, loaded by the application program, of the target application includes application code of the target application and resources of the target application. The application code of the target application includes at least application program package code. The resources of the target application include at least a sound, an image, a font, a cursor, a menu, a dialog box, a toolbar, a handle, and a memory.

In this embodiment, when detecting the first trigger event of the target application, the system service further determines whether the system service meets a preset condition, and performs preloading in response to the first trigger event when determining that the system service meets the preset condition. Specifically, the system service detects whether remaining use space of the memory is within a preset storage space range, detects whether CPU usage is within a second preset range, detects whether the target application is in a preset application list, and performing preloading in response to the first trigger event when determining that the remaining use space of the memory is within the preset storage space range, the CPU usage is within the second preset range, and the target application is in the preset application list. In this embodiment, the preset target application is an application frequently used by a user. In this way, in this application, when a first trigger event of the application frequently used by the user is detected, the application is preloaded, to increase an application startup rate.

It should be noted that, when detecting that the remaining use space of the memory is excessively small and is not within the preset storage space range, the system service releases, by using a system memory recycling mechanism, memory resources consumed by another application during preloading. In this way, when it is detected that memory resources are insufficient before the target application performs a preloading process, the memory resources consumed by the another application during preloading are released by using the system memory recycling mechanism, thereby ensuring execution of preloading of the target application.

Step S104: The application program waits to receive a message based on the communication address.

In this embodiment, that the application program waits to receive a message based on the communication address includes: the application program creates a server or a client based on the communication address; and the server or the client waits to receive a message based on the communication address. In this embodiment, the communication address is a socket address, the server is a socket server, and the client is a socket server. In this embodiment, the application program creates the server or the client based on the communication address by using a socket.socket( ) function.

Step S105: The system service detects whether a second trigger event occurs on the target application, where step S106 is performed if the second trigger event occurs on the target application; otherwise, or step S105 is repeatedly performed if no second trigger event occurs on the target application.

In this embodiment, when detecting the first trigger event of the target application and then releasing the trigger operation, the system service determines that the second trigger event occurs on the target application. For a detailed process of detecting the second trigger event of the target application by the system service process, refer to FIG. 4, FIG. 7, and the following detailed descriptions of FIG. 4 and FIG. 7.

Step S106: The system service generates a startup instruction in response to the second trigger event of the target application, and sends the startup instruction to the application program.

Step S107: The application program receives the startup instruction by using the communication address.

In this embodiment, the system service sends the startup instruction to the application program by using a socket message. The server or the client in the application program listens to and receives, by using an accept( ) function and the communication address, the startup instruction sent by the system service.

Step S108: The application program starts the target application in response to the startup instruction.

In this embodiment, that the application program starts the target application in response to the startup instruction includes: The application program starts the target application by using the data of the target application in response to the startup instruction. In this embodiment, when the application program detects, by using the server or the client, the startup instruction sent by the system service, the application program starts the target application by using the data of the target application in response to the startup instruction, so that socket blocking is implemented when the application program starts the target application. Therefore, in a preloading process of the application program of the target application before the application program of the target application receives the startup instruction, no excessive CPU resources, input/output resources, or memory space needs to be occupied, thereby ensuring controllable preloading behavior of the target application and increasing an application startup speed.

In this embodiment, after receiving the startup instruction sent by the system service, the application program invokes and executes the application code of the target application by using an oncreat( ) function.

In this embodiment, before the application program receives the startup instruction by using the server or the client, the method further includes: Before the server or the client receives the startup instruction, the application program suspends execution of the application code of the target application, and waits to receive the startup instruction; the application program skips creating a child thread service; and the application program skips initializing binder communication. In this embodiment, before receiving the startup instruction, the application program suspends execution of the application code of the target application, skips creating a child thread service, and skips initializing binder communication. Therefore, in the preloading process of the application program of the target application before the application program of the target application receives the startup instruction, no CPU resources or input/output resources need to be occupied.

Figure 2A:
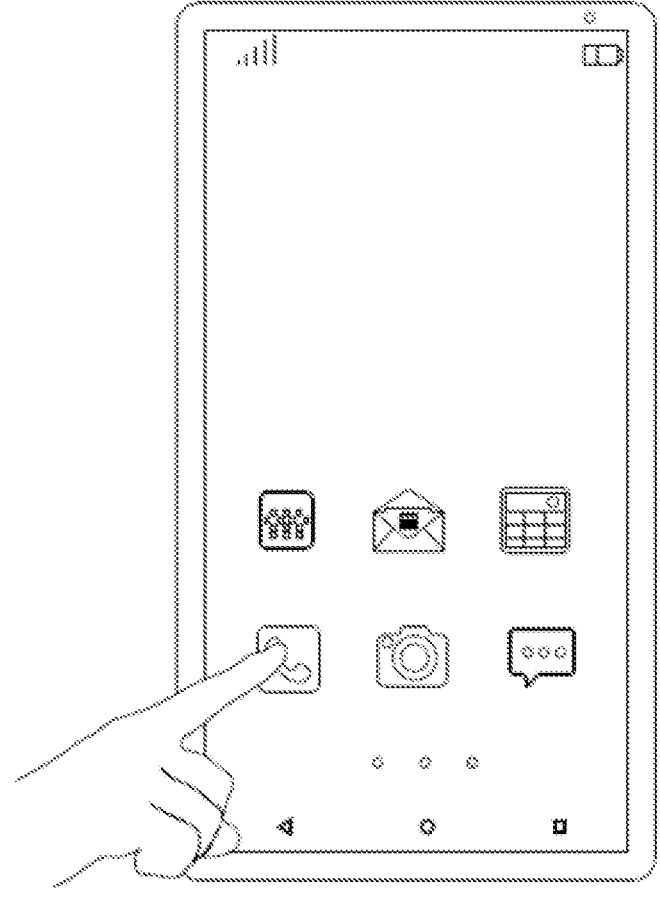
FIG. 2A is a schematic diagram of a first trigger event occurring on a target application according to an embodiment of this application.
Figure 3:
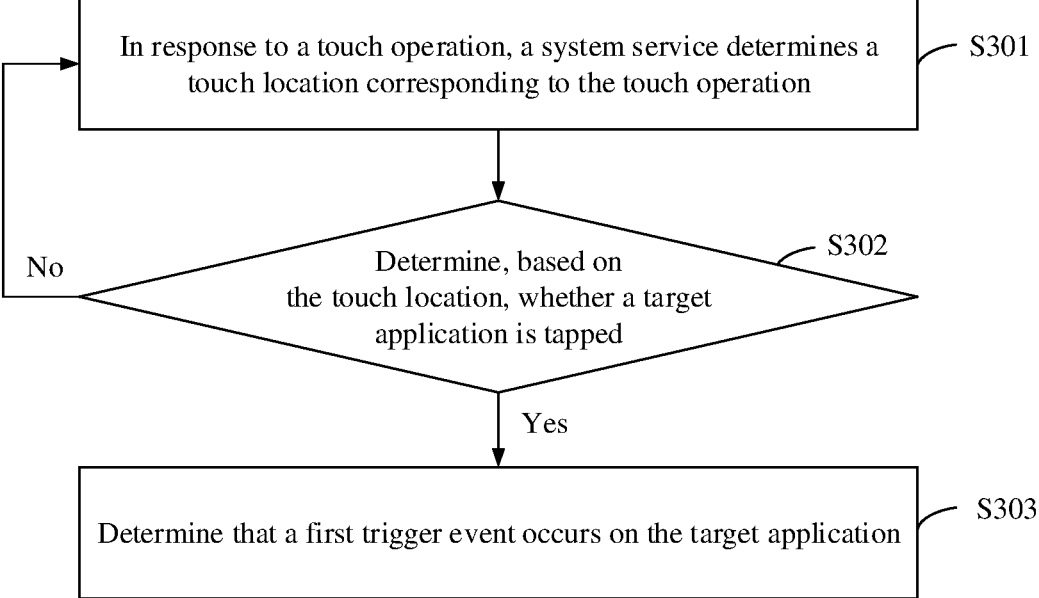
FIG. 3 is a flowchart of a method for detecting a first trigger event of a target application by a system service according to an embodiment of this application.

In this embodiment, when detecting that the user performs the touch operation on the target application on a display screen of the electronic device 1, the system service determines that the first trigger event occurs on the target application. Specifically, FIG. 2A is a schematic diagram of a first trigger event occurring on a target application according to an embodiment of this application. FIG. 3 is a flowchart of a method for detecting a first trigger event of a target application by a system service according to an embodiment of this application. The method may specifically include the following steps.

Step S301: In response to the touch operation, the system service determines a touch location corresponding to the touch operation.

Step S302: The system service determines, based on the touch location, whether the target application is touched.

Step S303: If it is determined that the target application is touched, the system service determines that the first trigger event occurs on the target application.

Figure 2B:
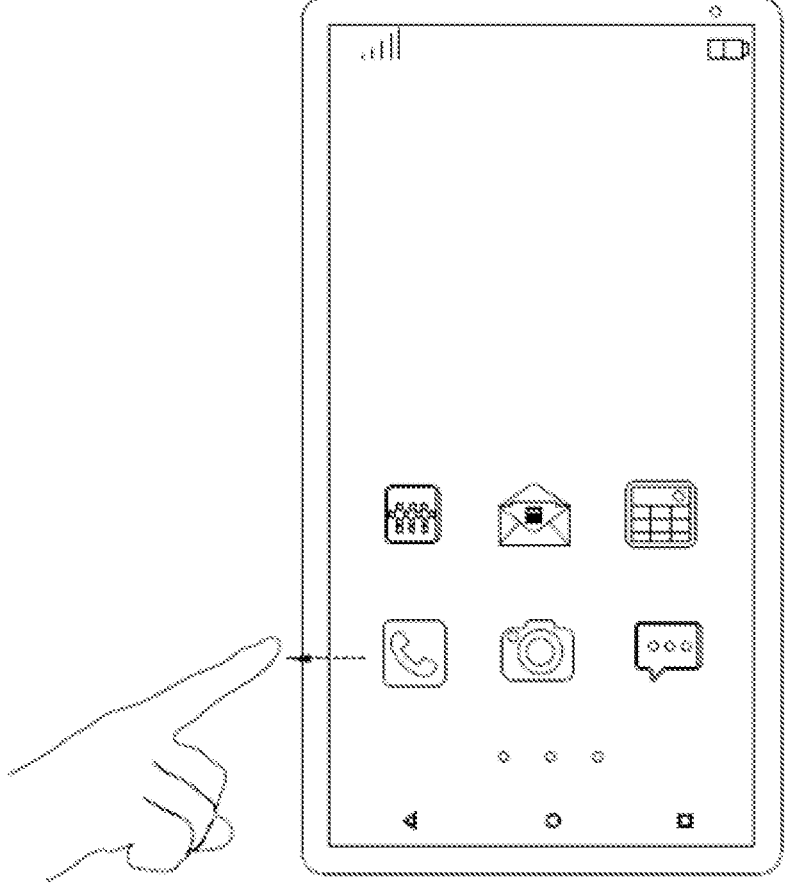
FIG. 2B is a schematic diagram of a second trigger event occurring on a target application according to an embodiment of this application.
Figure 4:
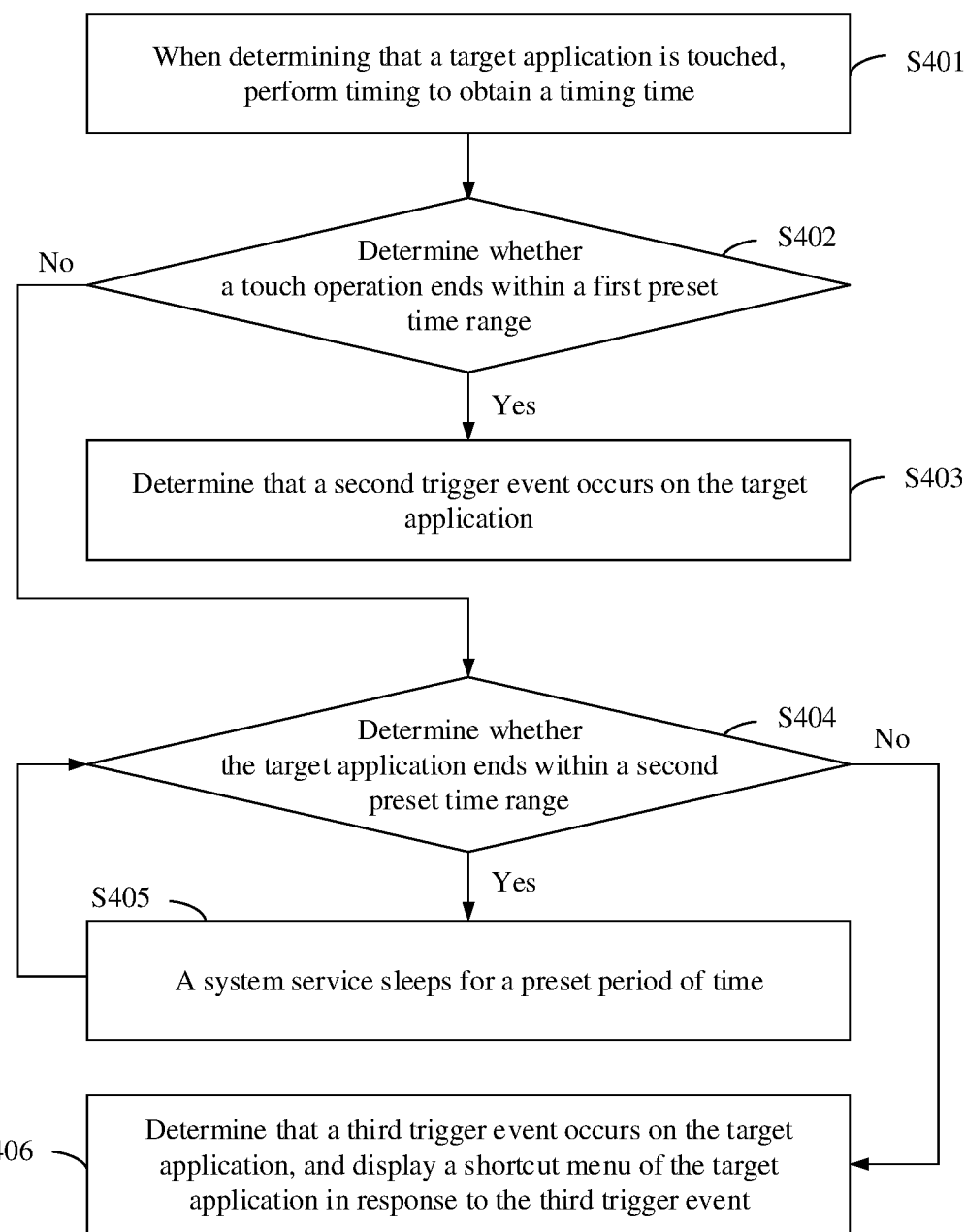
FIG. 4 is a flowchart of a method for detecting a second trigger event of a target application by a system service according to an embodiment of this application.

In an embodiment, when detecting that the user performs the touch operation on the target application and then stops performing the touch operation on the target application, the system service determines that the second trigger event occurs on the target application. Specifically, FIG. 2B is a schematic diagram of a second trigger event occurring on a target application according to an embodiment of this application. FIG. 4 is a flowchart of a method for detecting a second trigger event of a target application by a system service according to an embodiment of this application. The method may specifically include the following steps.

Step S401: When determining that the target application is touched, the system service performs timing to obtain a timing time.

Step S402: Determine whether the touch operation on the target application ends within a first preset time range, where step S403 is performed if the touch operation on the target application ends within the first preset time range, or step S404 is performed if the touch operation on the target application does not end within the first preset time range.

Step S403: Determine that the second trigger event occurs on the target application.

Step S404: Determine whether the target application ends within a second preset time range, where step S405 is performed if the touch operation ends within the second preset time range, or step S406 is performed if the touch operation does not end within the second preset time range.

Step S405: The system service sleeps for a preset period of time.

Step S406: Determine that a third trigger event occurs on the target application, and display a shortcut menu of the target application in response to the third trigger event.

Step S402: Determine whether the touch operation ends, where step S403 is performed if the touch operation, or step S404 is performed if the touch operation does not end.

Figure 5:
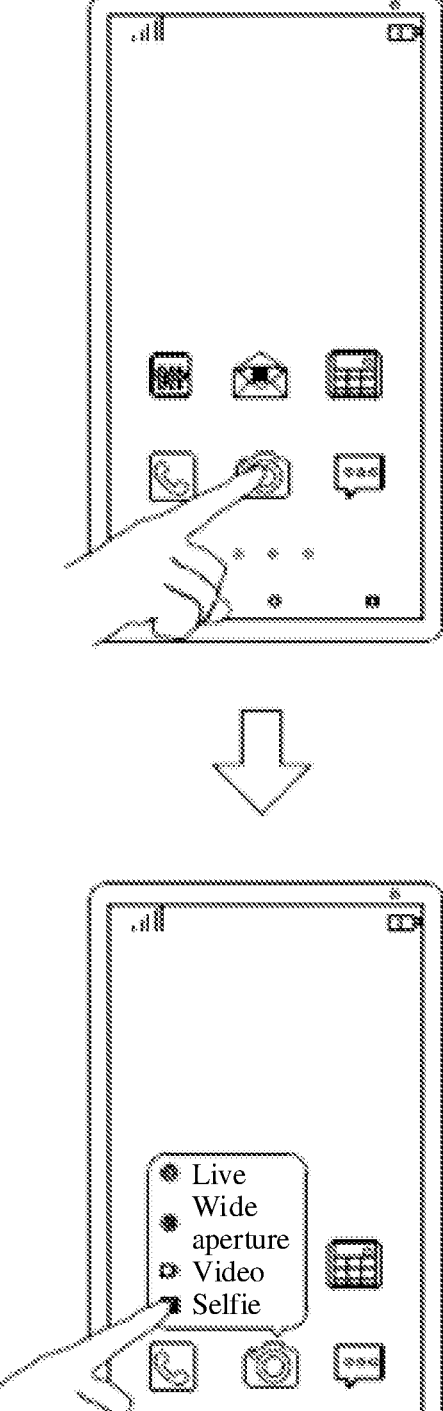
FIG. 5 is a schematic diagram of generating a shortcut menu after a target application is touched according to an embodiment of this application.
Figure 6:
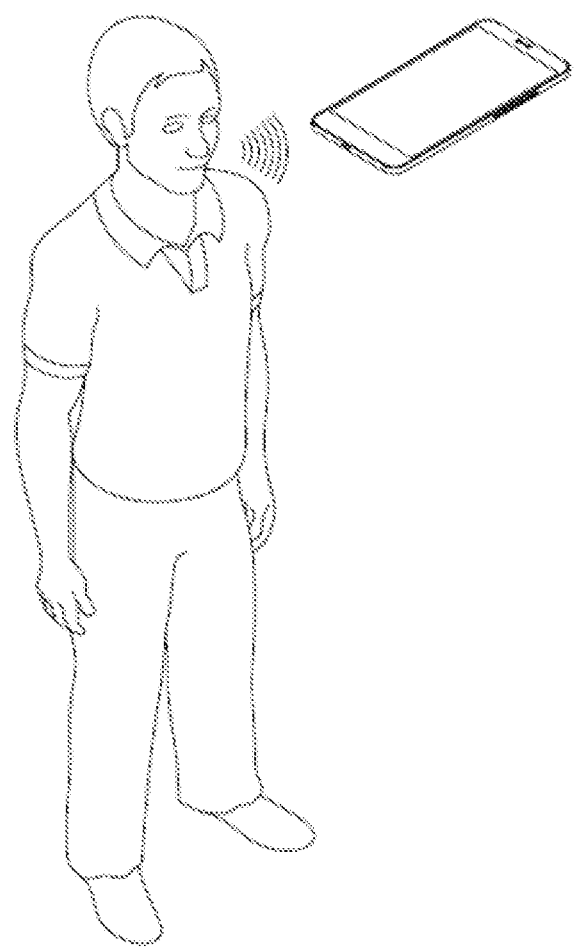
FIG. 6 is a schematic diagram of a first trigger event occurring on a target application according to another embodiment of this application.
Figure 7:
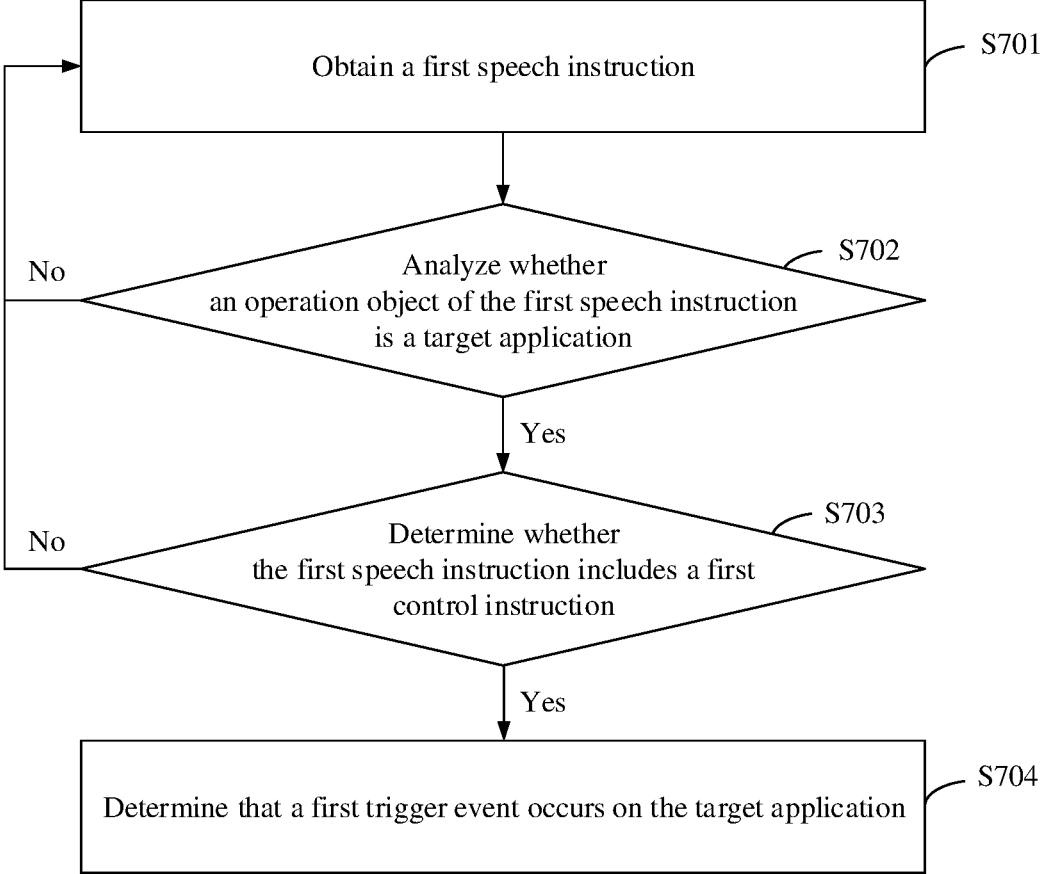
FIG. 7 is a flowchart of a method for detecting a first trigger event of a target application by a system service according to another embodiment of this application.

FIG. 5 is a schematic diagram of generating a shortcut menu after a target application is touched according to an embodiment of this application. In this embodiment, when the system service determines that the third trigger event occurs on the target application, the system service does not start the target application, but displays the shortcut menu of the target application for the user to perform an operation on a corresponding shortcut function of the target application. As shown in FIG. 5, when a time of touching and holding a camera application by the user exceeds the second preset time range, the system service does not start the target application, but displays the shortcut menu of the target application. The displayed shortcut menu includes at least a selfie function option, and a selfie function of the camera application is performed when the user selects the selfie function option. In an embodiment, when detecting a first speech instruction for the target application, the system service determines that the first trigger event occurs on the target application. Specifically, FIG. 6 is a schematic diagram of a first trigger event occurring on a target application according to an embodiment of this application. FIG. 7 is a flowchart of a method for detecting a first trigger event of a target application by a system service according to an embodiment of this application. The method may specifically include the following steps.

Step S701: The system service obtains the first speech instruction.

Step S702: Analyze whether an operation object of the first speech instruction is the target application.

Step S703: If the operation object of the first speech instruction is the target application, determine whether the first speech instruction includes a first control instruction.

Step S704: If it is determined that the first speech instruction includes the first control instruction, determine that the first trigger event occurs on the target application.

In this embodiment, the system service recognizes the first speech instruction by using a speech recognition unit. The first speech instruction includes the operation object and the first control instruction for the operation object. For example, the first speech instruction may be "load a music player", where the "music player" is the operation object, and "load" is the first control instruction. If the system service detects the first speech instruction "load a music player", the system service determines that the target application in the first speech instruction is the "music player", determines that the first control instruction in the first speech instruction is "load", and determines that the first trigger event occurs on the "music player".

Figure 8:
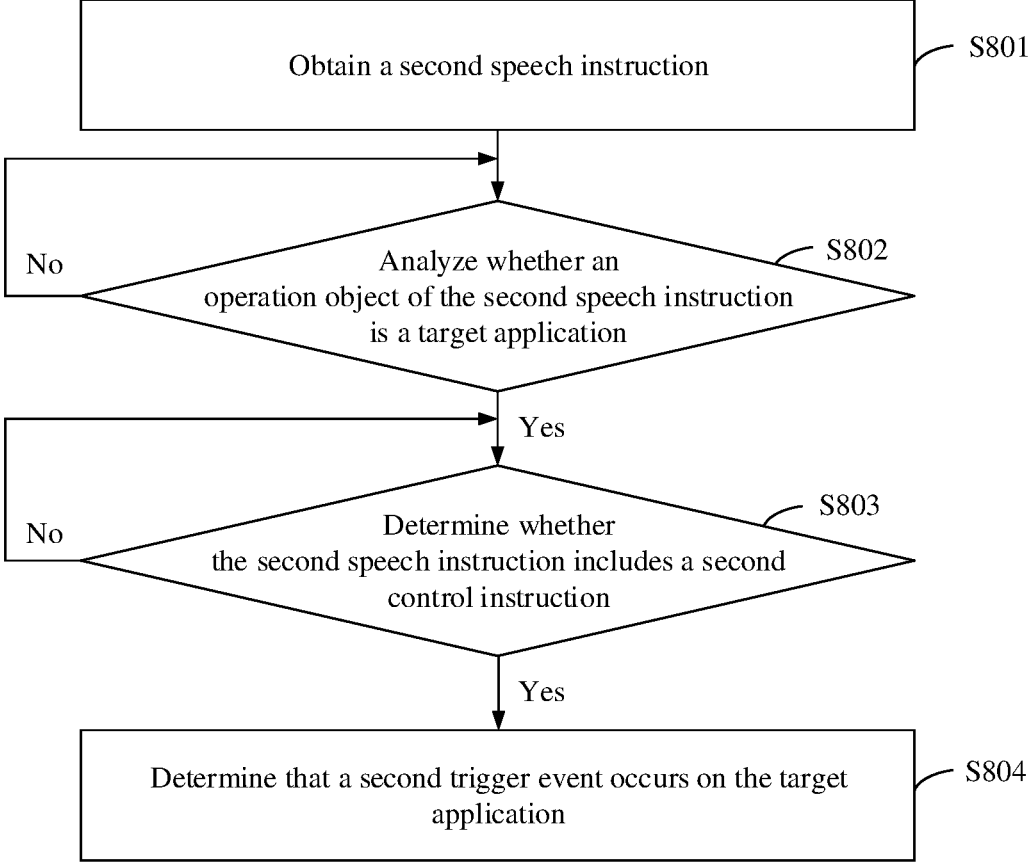
FIG. 8 is a flowchart of a method for detecting a second trigger event of a target application by a system service according to an embodiment of this application.
Figure 9:
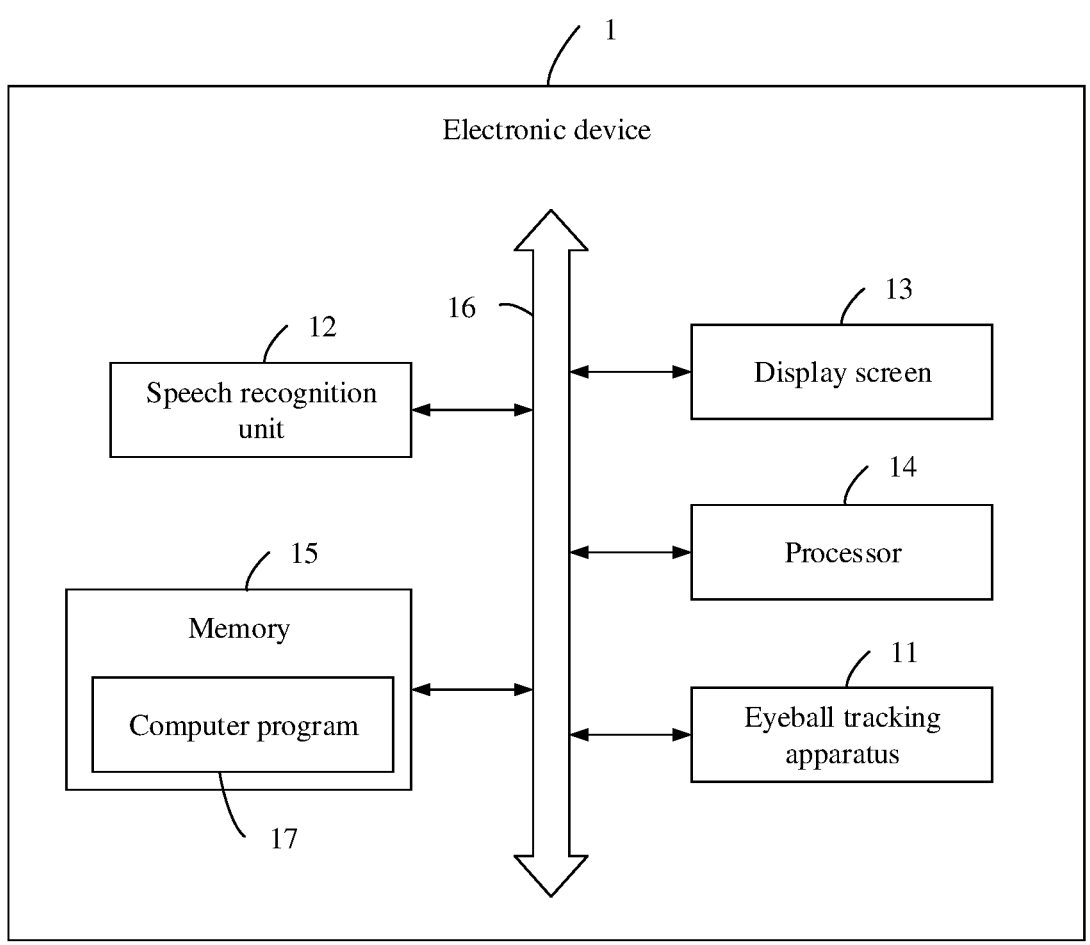
FIG. 9 is a schematic diagram of a structure of an electronic device according to an embodiment of this application.

In an embodiment, when detecting a second speech instruction for the target application, the system service determines that the second trigger event occurs on the target application. Specifically, FIG. 8 is a flowchart of a method for detecting a second trigger event of a target application by a system service according to an embodiment of this application. The method may specifically include the following steps.

Step S801: The system service obtains the second speech instruction.

Step S802: Analyze whether an operation object of the second speech instruction is the target application.

Step S803: If the operation object of the second speech instruction is the target application, determine whether the second speech instruction includes a second control instruction.

Step S804: If it is determined that the second speech instruction includes the second control instruction, determine that the second trigger event occurs on the target application.

In this embodiment, the second speech instruction includes the operation object and the second control instruction for the operation object. For example, the second speech instruction may be "start a music player", where the "music player" is the operation object, and "start" is the second control instruction. If the system service detects the second speech instruction "start a music player", the system service determines that the target application in the second speech instruction is the "music player", determines that the second control instruction in the second speech instruction is "start", and determines that the second trigger event occurs on the "music player".

It should be noted that, when the system service detects the first speech instruction for the target application and determines that the first trigger event occurs on the target application, the method is not limited to an implementation of determining, by detecting a speech instruction, that the second trigger event occurs on the target application, but may further include an implementation of determining, by detecting that the user performs a touch operation on the target application and then stops the touch operation on the target application, that the second trigger event occurs on the target application.

In an embodiment, the system service detects eyeball tracking information of the user, and determines, based on the eyeball tracking information, the target application and whether the first trigger event occurs on the target application. Specifically, the system service obtains the eyeball tracking information of the user, and determines, based on the eyeball tracking information, that the first trigger event occurs on a target application whose gaze duration exceeds first preset duration. In this embodiment, the system service may obtain the tracking information by using an eyeball tracking apparatus. The eyeball tracking apparatus is an infrared sensor or a camera. Longer duration of gazing at an application by the user indicates that the user is more likely to start the application program. Therefore, an application corresponding to an application icon on which gaze duration of eyes of the user is longer than preset duration may be determined as the target application based on the eyeball tracking information. In another embodiment, the system service determines an eyeball motion trajectory of the user based on the eyeball tracking information; determines, based on the eyeball motion trajectory, a quantity of times that the user looks at each application icon on the electronic device 1; and determines that the first trigger event occurs on a target application for which the quantity of times exceeds a first preset threshold.

In an embodiment, the system service further determines, based on the eyeball tracking information, whether the second trigger event occurs on the target application. Specifically, the system service determines, based on the eyeball tracking information, whether gaze duration of the target application exceeds second preset duration; and if the gaze duration of the target application exceeds the second preset duration, determines that the second trigger event occurs on the target application. In another embodiment, the system service determines, based on the eyeball tracking information, a quantity of times that an eyeball motion trajectory of the user passes an icon of the target application; and when the quantity of times exceeds a second preset threshold, determines that the first trigger event occurs on the target application.

In an embodiment, the system service determines, based on location information of the electronic device 1, whether the first trigger event occurs on the target application. Specifically, the system service obtains a location of the electronic device 1; determines whether the location of the electronic device 1 is within a preset area range; and if it is determined that the location of the electronic device 1 is within the preset area range, determines that the first trigger event occurs on the target application on the electronic device 1. In another embodiment, the system service determines, based on time information, whether the first trigger event occurs on the target application. Specifically, the system service determines whether a current time is within a preset time range; and if it is determined that the current time is within the preset time range, determines that the first trigger event occurs on the target application. In this embodiment, the target application is an application of a preset type. Preset types include a game application type and a video application type. It should be noted that start time of a game application and start time of a video application are long. Therefore, the user may set the two types as the preset types, so that application programs of the two types can be preloaded, to reduce a waiting time during startup of the application programs.

In an embodiment, the system service performs timing after determining that the first trigger event occurs on the target application, and determines, based on a timing time, whether the second trigger event occurs on the target application. Specifically, when determining that the first trigger event occurs on the target application, the system service performs timing to obtain the timing time; the system service determines whether the timing time is greater than a second preset time threshold; and if the system service determines that the timing time is greater than the second preset time threshold, it is determined that the second trigger event occurs on the target application.

In an embodiment, the system service analyzes, by using a machine learning algorithm, a behavior condition of using the target application by the user; and if it is determined that the target application meets the behavior condition, determines that the first trigger event occurs on the target application. Specifically, the system service obtains first historical data of using the target application by the user, where the first historical data includes at least time information, frequency information, and location information of using the target application; the system service analyzes the first historical data by using a machine learning method, and determines the behavior condition of the user for the target application; the system service determines whether the target application meets the behavior condition; and if it is determined that the target application meets the behavior condition, it is determined that the first trigger event occurs on the target application.

For example, the system service analyzes, by using the machine learning method, the time information of using the target application to determine a time period in which the user uses the target application, and uses the time period in which the user uses the target application as the behavior condition. When determining that a current time is within the time period in which the target application is used, the system service determines that the target application meets the behavior condition, and determines that the first trigger event occurs on the target application.

For another example, the system service analyzes, by using the machine learning method, the frequency information of using the target application to determine frequency of using the target application by the user, and uses the frequency of using the target application by the user as the behavior condition. When determining that the frequency of using the target application exceeds a preset frequency threshold, the system service determines that the target application meets the behavior condition, and determines that the first trigger event occurs on the target application.

For another example, the system service analyzes, by using the machine learning method, the location information of using the target application to determine a location at which the user uses the target application, and uses the location at which the user uses the target application as the behavior condition. When determining that the location at which the target application is used is within a preset location range, the system service determines that the target application meets the behavior condition, and determines that the first trigger event occurs on the target application.

In another embodiment, the system service may use, as the behavior condition, a combination of the time period in which the user uses the target application, the frequency of using the target application by the user, and the location at which the user uses the target application; and when determining that the target application meets the behavior condition, determine that the first trigger event occurs on the target application. For the determining whether the target application meets the behavior condition, refer to the descriptions in the foregoing content. Details are not described herein again.

In an embodiment, when receiving a preset broadcast message, the system service determines that the second trigger event occurs on the target application. The preset broadcast message indicates to start a specified target application.

In an embodiment, when receiving a first preset instruction sent by a service component, the system service determines that the second trigger event occurs on the target application. The first preset instruction instructs to start a specified target application.

In an embodiment, when receiving a first preset instruction sent by a service component, the system service determines that the second trigger event occurs on the target application. The first preset instruction instructs to start a specified target application.

In an embodiment, when receiving a second preset instruction sent by an activity component, the system service determines that the second trigger event occurs on the target application. The second preset instruction instructs to start a specified target application.

In an embodiment, when receiving a third preset instruction sent by a provider component, the system service determines that the second trigger event occurs on the target application. The third preset instruction instructs to start a specified target application.

In an embodiment, that the system service generates a preload instruction in response to the first trigger event, to preload the target application includes: when the system service detects that the first trigger event occurs on a plurality of target applications, obtaining second historical data of the plurality of target applications; determining a high-frequency usage time period or usage frequency of the plurality of target applications based on the second historical data of the plurality of target applications; sorting the plurality of target applications based on a high-frequency usage time period or usage frequency of each target application; and sequentially preloading the plurality of application programs based on the sorting. In this way, when the first trigger event occurs on the plurality of target applications, the system service may preload a target application program with a higher level based on priority levels, thereby facilitating usage by the user.

FIG. 8 is a schematic diagram of a structure of an electronic device 1 according to an embodiment of this application. The electronic device 1 includes but is not limited to an eyeball tracking apparatus 11, a speech recognition unit 12, a display screen 13, a processor 14, and a memory 15. The foregoing devices may be connected by using one or more communication buses 16. The eyeball tracking apparatus 11 is an infrared sensor or a camera. The speech recognition unit 12 is a speech recognition area. The display screen 13 is a liquid crystal display with a touch function. The memory 15 is configured to store one or more computer programs 17. The one or more computer programs 17 are configured to be executed by the processor 14. The one or more computer programs 17 include a plurality of instructions. When the plurality of instructions are executed by the processor 14, the method for accelerating application startup that is performed on the electronic device 1 in the foregoing embodiments may be implemented, to implement a function, of the electronic device 1, of accelerating application startup.

An embodiment further provides a computer storage medium. The computer storage medium stores computer instructions. When the computer instructions are run on an electronic device, the electronic device is enabled to perform the foregoing related method steps to implement the unlock control method in the foregoing embodiments.

An embodiment further provides a computer program product. When the computer program product is run on a computer, the computer is enabled to perform the foregoing related steps to implement the unlock control method in the foregoing embodiments.

In addition, an embodiment of this application further provides an apparatus. The apparatus may be specifically a chip, a component, or a module, and the apparatus may include a processor and a memory that are connected to each other. The memory is configured to store computer-executable instructions. When the apparatus runs, the processor may execute the computer-executable instructions stored in the memory, so that the chip performs the unlock control method in the foregoing method embodiments.

The electronic device, the computer storage medium, the computer program product, and the chip provided in the embodiments are all configured to perform the corresponding methods provided in the foregoing descriptions. Therefore, for beneficial effects that can be achieved by the electronic device, the computer storage medium, the computer program product, and the chip, refer to the beneficial effects of the corresponding methods provided in the foregoing descriptions. Details are not described herein again.

Based on the foregoing descriptions of the implementations, a person skilled in the art may clearly understand that, for the purpose of convenient and brief descriptions, division into the foregoing functional modules is merely used as an example for descriptions. During actual application, the foregoing functions can be allocated to different functional modules for implementation based on a requirement, in other words, an inner structure of an apparatus is divided into different functional modules to implement all or some of the functions described above.

In the several embodiments provided in this application, it should be understood that the disclosed apparatuses and methods may be implemented in other manners. For example, the described apparatus embodiments are merely examples. For example, division into the modules or units is merely logical function division, and there may be other division manners during actual implementation. For example, a plurality of units or components may be combined or may be integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may be one or more physical units, that is, may be located in one place, or may be distributed in a plurality of different places. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of steps of methods in embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

Finally, it should be noted that the foregoing embodiments are merely intended to describe the technical solutions of this application, but should not be construed as a limitation. Although this application is described in detail with reference to example embodiments, a person of ordinary skill in the art should understand that modifications or equivalent replacements may be made to the technical solutions of this application, without departing from the spirit and scope of the technical solutions of this application.

What is claimed is:

1. A method, wherein the method comprises:

detecting, by a system service, a first trigger event of a target application, wherein detecting the first trigger event of the target application comprises:

when detecting a touch operation on the target application, determining, by the system service, that the first trigger event occurs on the target application;

loading, by the system service, an application program of the target application in response to the first trigger event, and transmitting a communication address to the application program;

performing, by the application program, preloading;

waiting, by the application program, to receive a startup instruction based on the communication address, wherein the application program does not startup while waiting for the startup instruction;

detecting, by the system service, a second trigger event of the target application, wherein detecting the second trigger event of the target application comprises:

after detecting the first trigger event of the target application, when determining that the target application is touched, performing, by the system service, timing to obtain a timing time;

determining whether the touch operation on the target application ends within a first preset time range; and in response to determining the touch operation on the target application ends within the first preset time range, determining that the second trigger event occurs on the target application;

generating, by the system service, the startup instruction in response to detecting the second trigger event of the target application, and sending the startup instruction to the application program;

receiving, by the application program, the startup instruction by using the communication address; and starting, by the application program, the target application in response to receiving the startup instruction.

2. The method according to claim 1, wherein waiting, by the application program, to receive the startup instruction based on the communication address comprises:

creating, by the application program, a server or a client based on the communication address; and waiting, by the server or the client, to receive the startup instruction based on the communication address.

3. The method according to claim 1, wherein determining, by the system service when detecting the touch operation on the target application, that the first trigger event occurs on the target application comprises:

in response to detecting the touch operation, determining, by the system service, a touch location corresponding to the touch operation;

determining, based on the touch location, whether the target application is touched; and when it is determined that the target application is touched, determining that the first trigger event occurs on the target application.

4. The method according to claim 1, wherein the method further comprises:

in response to determining the touch operation on the target application does not end within the first preset time range, determining, by the system service, whether the touch operation on the target application ends within a second preset time range; and in response to determining the touch operation ends within the second preset time range, sleeping, by the system service, for a preset period of time; or in response to determining the touch operation does not end within the second preset time range, determining, by the system service, that a third trigger event occurs on the target application, and displaying a shortcut menu of the target application in response to the third trigger event.

5. The method according to claim 1, wherein the target application is an application of a preset type.

6. The method according to claim 1, wherein loading, by the system service, the application program of the target application in response to the first trigger event comprises:

when the system service detects that the target application comprises a plurality of target applications, obtaining second historical data of the plurality of target applications;

determining usage frequency of the plurality of target applications based on the second historical data of the plurality of target applications;

sorting the plurality of target applications based on a usage frequency of each target application; and sequentially preloading the plurality of target applications according to the sorting.

7. The method according to claim 1, wherein loading, by the system service, the application program of the target application in response to the first trigger event comprises:

when the system service detects that the target application comprises a plurality of target applications, obtaining second historical data of the plurality of target applications;

determining a high-frequency usage time period of the plurality of target applications based on the second historical data of the plurality of target applications;

sorting the plurality of target applications based on a high-frequency usage time period of each target application; and sequentially preloading the plurality of target applications according to the sorting.

8. An electronic device, wherein the electronic device comprises a memory and at least one processor, wherein the memory stores program instructions; and wherein the at least one processor is configured to read and execute the program instructions stored in the memory, and when the program instructions are executed by the processor, the electronic device is enabled to perform:

detecting, by a system service of the electronic device, a first trigger event of a target application of the electronic device, wherein detecting, by the system service, the first trigger event of the target application comprises:

obtaining, by the system service, a first speech instruction;

analyzing whether an operation object of the first speech instruction is the target application;

when the operation object of the first speech instruction is the target application, determining whether the first speech instruction comprises a first control instruction; and when it is determined that the first speech instruction comprises the first control instruction, determining that the first trigger event occurs on the target application;

loading, by the system service, an application program of the target application in response to the first trigger event, and transmitting a communication address to the application program;

performing, by the application program, preloading;

waiting, by the application program, to receive a startup instruction based on the communication address, wherein the application program does not startup while waiting for the startup instruction;

detecting, by the system service, a second trigger event of the target application;

generating, by the system service, the startup instruction in response to the second trigger event of the target application, and sending the startup instruction to the application program;

receiving, by the application program, the startup instruction by using the communication address; and starting, by the application program, the target application in response to the startup instruction.

9. The electronic device according to claim 8, wherein waiting, by the application program, to receive the startup instruction based on the communication address comprises:

creating, by the application program, a server or a client based on the communication address; and waiting, by the server or the client, to receive the startup instruction based on the communication address.

10. The electronic device according to claim 8, wherein detecting, by the system service, the second trigger event of the target application comprises:

obtaining, by the system service, a second speech instruction;

analyzing whether an operation object of the second speech instruction is the target application;

when the operation object of the second speech instruction is the target application, determining whether the second speech instruction comprises a second control instruction; and when it is determined that the second speech instruction comprises the second control instruction, determining that the second trigger event occurs on the target application.

11. The electronic device according to claim 8, wherein the target application is an application of a preset type.

12. The electronic device according to claim 8, wherein waiting, by the application program, to receive the startup instruction based on the communication address comprises:

creating, by the application program, a server or a client based on the communication address; and waiting, by the server or the client, to receive the startup instruction based on the communication address.

13. The electronic device according to claim 8, wherein loading, by the system service, the application program of the target application in response to the first trigger event comprises:

when the system service detects that the target application comprises a plurality of target applications, obtaining second historical data of the plurality of target applications;

determining a high-frequency usage time period of the plurality of target applications based on the second historical data of the plurality of target applications;

sorting the plurality of target applications based on a high-frequency usage time period of each target application; and sequentially preloading the plurality of target applications according to the sorting.

14. The electronic device according to claim 8, wherein loading, by the system service, the application program of the target application in response to the first trigger event comprises:

when the system service detects that the target application comprises a plurality of target applications, obtaining second historical data of the plurality of target applications;

determining a usage frequency of the plurality of target applications based on the second historical data of the plurality of target applications;

sorting the plurality of target applications based on a usage frequency of each target application; and sequentially preloading the plurality of target applications according to the sorting.

15. A non-transitory computer storage medium, wherein the computer storage medium stores program instructions, and when the program instructions are run on an electronic device, the electronic device is enabled to perform:

detecting, by a system service of the electronic device, a first trigger event of a target application of the electronic device, wherein detecting, by the system service, the first trigger event of the target application comprises:

obtaining, by the system service, eyeball tracking information of a user; and determining, based on the eyeball tracking information, that the first trigger event occurs on a target application whose gaze duration exceeds a first preset duration;

loading, by the system service, an application program of the target application in response to the first trigger event, and transmitting a communication address to the application program;

performing, by the application program, preloading;

waiting, by the application program, to receive a startup instruction based on the communication address, wherein the application program does not startup while waiting for the startup instruction;

detecting, by the system service, a second trigger event of the target application;

generating, by the system service, the startup instruction in response to the second trigger event of the target application, and sending the startup instruction to the application program;

receiving, by the application program, the startup instruction by using the communication address; and starting, by the application program, the target application in response to the startup instruction.

16. The non-transitory computer storage medium according to claim 15, wherein detecting, by the system service, the second trigger event of the target application comprises:

determining, based on the eyeball tracking information, whether a gaze duration of the target application exceeds a second preset duration; and in response to determining that the gaze duration of the target application exceeds the second preset duration, determining that the second trigger event occurs on the target application.

17. The non-transitory computer storage medium according to claim 15, wherein the target application is an application of a preset type.

18. The non-transitory computer storage medium according to claim 15, wherein waiting, by the application program, to receive the startup instruction based on the communication address comprises:

creating, by the application program, a server or a client based on the communication address; and waiting, by the server or the client, to receive the startup instruction based on the communication address.

19. The non-transitory computer storage medium according to claim 15, wherein loading, by the system service, the application program of the target application in response to the first trigger event comprises:

when the system service detects that the target application comprises a plurality of target applications, obtaining second historical data of the plurality of target applications;

determining a high-frequency usage time period of the plurality of target applications based on the second historical data of the plurality of target applications;

sorting the plurality of target applications based on a high-frequency usage time period of each target application; and sequentially preloading the plurality of target applications according to the sorting.

20. The non-transitory computer storage medium according to claim 15, wherein loading, by the system service, the application program of the target application in response to the first trigger event comprises:

when the system service detects that the target application comprises a plurality of target applications, obtaining second historical data of the plurality of target applications;

determining a usage frequency of the plurality of target applications based on the second historical data of the plurality of target applications;

sorting the plurality of target applications based on usage frequency of each target application; and sequentially preloading the plurality of target applications according to the sorting.

* * * * *